Oct. 14, 1952  G. B. STILLWAGON, JR  2,613,907
SEALING UNIT FOR A VALVE MECHANISM
Filed Jan. 29, 1945
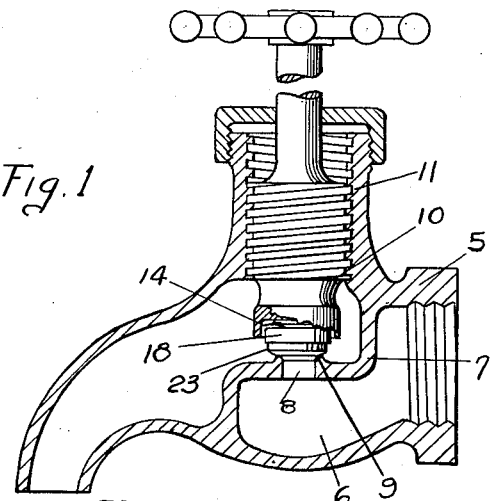
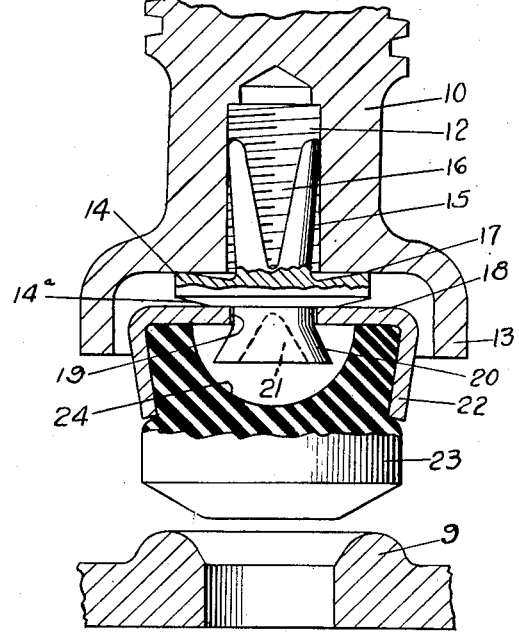
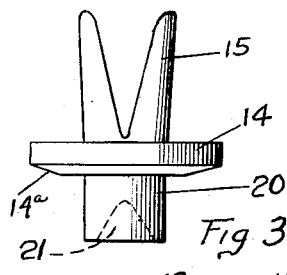
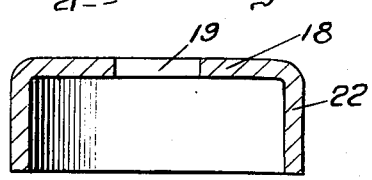
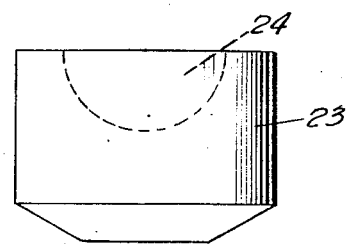
INVENTOR.
GEORGE B. STILLWAGON-JR.
BY
ATTORNEY Patented Oct. 14, 1952

2,613,907

UNITED STATES PATENT OFFICE 2,613,907

SEALING UNIT FOR A VALVE MECHANISM

George B. Stillwagon, Jr., Dayton, Ohio, assignor of one-half to Kenneth G. Fraser, Dayton, Ohio Application January 29, 1945, Serial No. 575,166

4 Claims. (Cl. 251—46)

1

This invention relates to a sealing unit for a valve mechanism and more particularly to a rotatable and detachable sealing unit for use in faucets and similar valve structures.

In a standard type of faucet the movable valve member, or valve stem, is rotatably mounted in and has screw threaded connection with the body of the faucet. A sealing member, or washer, is rigidly but detachably secured to the inner end of the valve stem, by a screw threaded into the latter, and is moved thereby into sealing contact with the valve seat. The sealing member being rigid with the valve member rotates in contact with the valve seat as it is moved to sealing position and this moving contact subjects the sealing member to severe wear which sooner or later causes the faucet to leak. When this occurs the sealing member must be removed and replaced by a new sealing member.

It has been proposed heretofore to provide a sealing member which could be rotatably connected with the valve stem of such a faucet, in substitution for the fixed sealing member, so that the contact of the sealing member with the valve seat would prevent its rotation during the seating thereof. Various devices of this kind have been placed on the market but, so far as I am informed, none of them has been entirely satisfactory for various reasons, such as excessive friction which caused the sealing member to be dragged along with the valve stem after it had engaged the valve seat; difficulty in maintaining the connection between the sealing member and the valve stem when the latter was moved to an upright position for reinsertion in the faucet structure; the necessity of making the sealing member of very soft rubber which had a short life; and high cost of production.

One object of the invention is to provide a sealing unit of a simple inexpensive construction which can be quickly and easily attached to and removed from the valve stem and in which the sealing member will be freely rotatable.

A further object of the invention is to provide such a sealing unit which, while removable from the valve stem, will be retained thereon when the latter is in an upright position and the sealing member is out of contact with the valve seat.

A further object of the invention is to provide such a sealing unit in which the friction between relatively movable parts will be insufficient to cause the sealing member to rotate while in contact with the valve seat.

A further object of the invention is to provide such a sealing unit in which the sealing member

2 will automatically adjust itself with relation to the valve seat in case of misalinement.

A further object of the invention is to provide such a sealing unit which will be free from looseness such as would cause vibration or "water hammer."

A further object of the invention is to provide such a sealing unit in which the sealing member may be made of material of such hardness that it will have a long useful life and at the same time will have sufficient resiliency to effect a tight seal on the valve seat.

A further object of the invention is to provide a sealing unit in which the sealing member and the means for attaching the same to the valve stem are assembled as a unit and are relatively rotatable.

A further object of the invention is to provide a sealing unit in which the several parts are of such a character that they may be produced at a low cost and easily assembled.

Other objects of the invention may appear as the device is described in detail.

In the accompanying drawings Fig. 1 is a sectional view taken through a faucet, showing the invention applied thereto; Fig. 2 is an enlarged sectional view taken through a portion of the valve stem of the faucet and through the sealing unit; and Figs. 3, 4 and 5 are detail views of the several parts of the device prior to assembly.

In these drawings I have illustrated one embodiment of my invention and have shown the same as applied to a water faucet of a well known type, but it is to be understood that the sealing unit may take various forms and may be applied to valve mechanisms of various kinds without departing from the spirit of the invention.

The faucet here shown comprises a body 5, the water passage 6 of which is divided by a transverse partition 7 having a port 8 surrounded by a valve seat 9. The movable member 10, which carries the sealing member and is herein referred to as the valve stem, is mounted in and has screw threaded connection with the extension 11 of the body and is provided in its inner, or lower, end with an axial opening 12 which is screw threaded to receive the screw by which the usual fixed sealing member or washer is attached thereto, said inner end having a circumferential flange 13 forming a seat to receive the sealing member. Thus the sealing member is moved into and out of contact with the valve seat by the rotation of the valve stem and if the sealing member is fixed with relation to the valve stem it will rotate in contact with the valve seat as it is being pressed into tight sealing contact therewith.

The sealing unit of the present invention is designed to be attached to the valve stem in substitution for the fixed sealing member or washer. It comprises an attaching device, adapted to be removably supported on the valve stem for movement therewith, a supporting member carried by and rotatable with relation to the attaching device, and a sealing member secured to the supporting member. The several parts of the sealing unit and the connections between the same may take various forms. In the preferred form, here illustrated, the attaching device includes a thin bearing plate or disk 14 preferably of metal and adapted to bear against a flat lower end of the valve stem about the axial opening 12. Connected with the plate 14 is a connecting part, such as a stud 15, adapted to extend into the opening 12 and to be removably supported therein in such a manner that it will not be withdrawn by the weight of the sealing unit when the latter is suspended from the valve stem. Preferably the connecting part 15 is slidably inserted in the opening and is frictionally connected with the threaded slot thereof. As here shown, the stud 15 is integral with the bearing plate, is of less diameter than the threaded opening and has that end which extends into the opening split and slightly expanded, as shown at 16, so that the separated end portions thereof will yield laterally. The outer edges of these end portions are slightly beveled to facilitate the entrance of the stud into the opening and to cause the separated end portions to ride over the threads and to then grip the same with sufficient firmness to support the weight of the sealing unit as a whole. That portion of the plate 14 which is adjacent the stud may be slightly recessed to provide the plate with a relatively narrow annular outer portion 17 to engage the end of the valve stem and thus minimize the tendency of the plate to tilt or rock due to minor irregularities in the end surface of the valve stem.

The supporting structure for the sealing member may be of any suitable character and may be connected with the plate 14 in any suitable manner which will permit its free rotation with relation to the plate. It preferably comprises a plate-like part 18 having a smooth surface to engage the bearing plate 14 and having means for supporting the sealing member in contact with the opposite surface thereof. The supporting member is provided with a central opening 19 through which extends a stud 20 rigidly secured to and preferably integral with the bearing plate 14. The stud 20 is of a diameter sufficiently less than the diameter of the opening 19 to permit the free rotation of the supporting member thereon, and that end thereof which extends beyond the opening is provided with means for retaining the supporting member on the stud. Preferably this end of the stud is upset to form a head to retain the supporting member on the stud, care being taken that the upset head does not press the supporting member against the bearing plate 14 in such a manner as to interfere with its rotation with relation thereto. The end of the stud 20 may be provided with a conical cavity 21 to facilitate the proper upsetting thereof. The lower surface of the bearing plate may have its outer portion inclined or beveled, as at 14a, so that a relatively narrow inner portion thereof will contact with the supporting member, thereby reducing the friction between the bearing plate and the supporting member and correspondingly reducing the tendency of the supporting member to rotate with the bearing plate when it is pressed against the latter. It is also desirable that the supporting member shall be capable of a slight vertical movement between the head of the stud and the bearing plate, and that the opening in the supporting member shall be sufficiently larger than the stud to permit the supporting member to have a slight tilting movement and thus enable the sealing member to automatically adjust itself with relation to the valve seat in case of a slight misalinement. However, there is not sufficient play between any of the parts to permit appreciable vibration or "water hammer."

The upper or plate-like portion of the supporting member is provided with a depending circumferential flange 22, thus imparting to the supporting member the form of an inverted cup. When the valve stem is provided with the flange 13 the supporting member lies partly within that flange. The sealing member 23 may be of any material which will have proper sealing contact with the valve seat and is preferably formed of a rubber composition. The upper portion of the sealing member extends into the cup-shaped supporting member and the flange of the latter is radially compressed, or crimped, about the same to securely connect the sealing member with the supporting member. This upper portion of the sealing member is preferably provided with a central recess 24 into which may lower end of the stud 20 extends and which may be of such a size as to materially increase the yieldability of the sealing member and thus permit the latter to be made of a material which is harder than and has greater resistance to deformation than would otherwise be practical. The sealing member has a sloping lower surface so arranged with relation to the valve seat that the pressure on the sealing member is in the direction of the recess 24, thus causing the hard sealing member to yield to a greater extent than it would yield in the absence of the recess.

The several parts of the sealing unit are of such a character that they can be produced at a low cost and easily assembled into the complete unit. When a sealing unit is to be substituted for the usual fixed sealing member or washer the valve stem is removed from the faucet and the attaching screw and washer are removed from the valve stem and discarded. The stud 15 of the sealing unit is then inserted in the threaded opening 12 from which the screw was removed, this being the only operation necessary to operatively connect the sealing unit with the valve stem. The valve stem is then reinserted in the faucet and the latter is again operative in the usual manner. The connection between the stud 15 and the valve stem being such as to support the weight of the sealing unit the connection will be maintained when the valve stem is moved to an upright position for reinsertion in the faucet and the sealing unit will not drop away from the valve stem while the latter is being screwed into the faucet, as frequently happens with some other types of sealing members. Further, this connection causes the sealing member to be moved out of engagement with the valve seat by the valve stem, and independently of water pressure. When the valve stem is screwed down to close the faucet the contact of the sealing member with the valve seat will press the supporting member 18 against the bearing plate 14 and will press the latter against the end of the valve stem. The relatively large frictional moment between the valve stem and the bearing plate will cause the latter to rotate with the valve stem. Due to the relatively small frictional contact between the bearing plate and the supporting member for the sealing member only a light resistance is necessary to hold the latter against rotation with the attaching device and valve stem. As a result the sealing member is held against rotation as soon as it engages the valve seat and the only wear thereon is that due to direct pressure. Thus the life of the sealing member is greatly increased and when it is worn out the sealing unit can very quickly be removed and a new unit substituted therefor.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. A sealing unit for a valve having a rotatable valve stem provided at its inner end with an axial opening, said unit including an imperforate plate, alined studs rigidly and permanently secured to the respective sides of said plate, one of said studs being adapted to be inserted in said opening in said valve stem and having means for frictionally retaining the same therein, a supporting member permanently and rotatably mounted on the other of said studs, the marginal portion of said plate being beveled to permit said supporting member to have tilting movement with relation to said plate, and a sealing member permanently secured to said supporting member, and movable by said valve stem into and out of engagement with the seat of said valve.

2. A sealing unit for a valve having a rotatable valve stem provided at its inner end with an axial opening, said unit including a plate having frictional connection with said stem for rotation thereby, alined studs rigidly secured to the respective sides of said plate, one of said studs being adapted to be inserted in said opening in said valve stem and having means for frictionally retaining the same therein, a supporting member rotatably supported on the other of said studs, and a sealing member secured to said supporting member and movable by said valve stem into and out of engagement with the seat of said valve, said supporting member frictionally engaging said plate when said sealing member engages said valve seat and the area of frictional contact between said plate and said valve stem being materially greater than the area of frictional contact between said plate and said supporting member.

3. A sealing unit for a valve having a rotatable valve stem provided at its inner end with an axial opening, said unit including a plate, alined studs rigidly secured to the respective sides of said plate, one of said studs being adapted to be inserted in said opening of said valve stem and having means for frictionally retaining the same therein, said plate having on the upper side thereof an annular surface extending radially beyond the opening in said valve stem and frictionally engaging the adjacent end of said stem, a supporting member rotatably supported on the other of said studs, and a sealing member secured to said supporting member and movable by said valve stem into and out of engagement with the seat of said valve, said plate having on the lower side thereof an annular surface to engage said supporting member and of a diameter materially less than the diameter of said upper annular surface of said plate, said annular surfaces being of approximately the same radial width, whereby the resistance to the rotation of said stem with relation to said plate will be greater than the resistance to the rotation of said plate with relation to said supporting member when said sealing member is in engagement with said valve seat.

4. A sealing unit for a valve having a rotatable valve stem provided at its inner end with an axial opening, said unit including a plate, alined studs rigidly secured to the respective side of said plate, one of said studs being adapted to be inserted in said opening of said valve stem and having means for frictionally retaining the same therein, said plate having on the upper side thereof an annular surface extending radially beyond the opening in said valve stem and frictionally engaging the adjacent end of said stem, a supporting member rotatably supported on the other of said studs and a sealing member secured to said supporting member and movable by said valve stem into and out of engagement with the seat of said valve, said plate having on the lower side thereof an annular surface to engage said supporting member and of a diameter materially less than the diameter of said upper annular surface of said plate, said annular surfaces being of approximately the same radial width, the marginal portion of the lower surface of said plate being bevelled to permit said supporting member to have tilting movement with relation to said plate.

GEORGE B. STILLWAGON, JR.

REFERENCES CITED

The following references are of record in the file of this patent:

UNITED STATES PATENTS

| Number | Name | Date |
|---|---|---|
| 1,939,363 | Pearson | Dec. 12, 1933 |
| 2,008,101 | Haury | July 16, 1935 |
| 2,077,766 | Mead | Apr. 20, 1937 |
| 2,203,684 | Hare | June 11, 1940 |
| 2,271,391 | Drake | Jan. 27, 1942 |

FOREIGN PATENTS

| Number | Country | Date |
|---|---|---|
| 394,290 | Germany | of 1924 |